United States Patent
Li et al.

(10) Patent No.: US 7,845,693 B2
(45) Date of Patent: Dec. 7, 2010

(54) HATCH STOP FOR WIND TURBINES

(75) Inventors: Rui Li, Shanghai (CN); Hua Yan, Shanghai (CN); Jianhua Han, Hebel (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/248,973

(22) Filed: Oct. 10, 2008

(65) Prior Publication Data

US 2010/0090479 A1 Apr. 15, 2010

(51) Int. Cl.
*E05C 19/18* (2006.01)
*E05C 19/00* (2006.01)

(52) U.S. Cl. .............. 292/288; 292/289; 292/292; 292/338; 292/342; 292/343; 292/DIG. 15; 16/82; 49/383; 49/394

(58) Field of Classification Search ............ 292/288, 292/289, 292, 295, 338, 339, 342, 343, DIG. 15, 292/302; D8/402; 49/383, 394; 16/82, 86 A, 16/86 B, 86 C, 86 R, 85, 404
See application file for complete search history.

(56) References Cited

U.S. PATENT DOCUMENTS

| | | | | |
|---|---|---|---|---|
| 83,967 A * | 11/1868 | Horrell | ................ | 292/288 |
| 786,831 A * | 4/1905 | McMahon | ............. | 292/343 |
| 2,172,610 A * | 9/1939 | Frank | ................ | 292/288 |
| 4,485,607 A * | 12/1984 | Nelson | .............. | 52/741.1 |
| 4,759,338 A * | 7/1988 | Croft | ................ | 126/25 R |
| D302,939 S * | 8/1989 | Ruskin | ............... | D8/402 |
| D317,239 S * | 6/1991 | Croft | ................. | D7/402 |
| 5,044,681 A * | 9/1991 | Neighbors | ........... | 292/288 |
| D347,570 S * | 6/1994 | Burge | ................ | D8/402 |
| 5,732,442 A * | 3/1998 | Haggard | ............. | 16/422 |
| D396,169 S * | 7/1998 | Williamson | ......... | D7/402 |
| 6,176,232 B1 * | 1/2001 | Corcoran | ............ | 126/25 R |
| 6,357,435 B1 * | 3/2002 | Van Hook | ............ | 126/25 R |
| 6,386,604 B1 * | 5/2002 | Scanlon | .............. | 292/339 |
| 6,550,828 B2 * | 4/2003 | Warden | .............. | 292/288 |
| 6,705,306 B1 * | 3/2004 | Dickey | .............. | 126/25 R |
| 2004/0055220 A1 * | 3/2004 | Lohman | .............. | 49/322 |
| 2004/0256866 A1 * | 12/2004 | Deming, Jr. | .......... | 292/343 |
| 2007/0028417 A1 * | 2/2007 | Emmitt | ................ | 16/82 |

FOREIGN PATENT DOCUMENTS

DE    3514244 A1 * 10/1986

* cited by examiner

*Primary Examiner*—Carlos Lugo
(74) *Attorney, Agent, or Firm*—William F. Heinze; Ernest G. Cusick; Frank A. Landgraff

(57) ABSTRACT

A hatch stop for a wind turbine having an enclosure with a hatch, including a first prong arranged between an external surface of the hatch and an external surface of the enclosure.

8 Claims, 2 Drawing Sheets

HATCH STOP FOR WIND TURBINES

BACKGROUND OF THE INVENTION

1. Technical Field

The subject matter described here generally relates to miscellaneous hardware such as closure checks, and, more particularly, to stops for wind turbine hatches.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

As illustrated in FIG. 2, various enclosures of the wind turbine 2, such as the nacelle enclosure 6, the hub cone enclosure 7 and/or other enclosures, are typically provided with a hatchway 20 for allowing access to the interior of the wind turbine 2. The hatchway 20 is typically covered by a door or hatch 22 that is connected to the enclosure by one or more hinges 24 on one side and a latch 26 on the other side. During normal maintenance and troubleshooting, the opened hatch 22 rests unsecured upon the external surface of the enclosure of wind turbine 2. However, in the high wind environments associated with wind turbines, such unsecured open hatches 22 can be blown closed at a high velocity, striking any personnel and/or equipment that may be present in the hatchway 20. Hatches 22 are therefore sometimes secured with a screwed C-clamp that compress the internal surface of the open hatch 22 toward the external surface of the enclosure.

BRIEF DESCRIPTION OF THE INVENTION

These and other drawbacks associated with such conventional approaches are addressed here in by providing, in various embodiments a hatch stop for a wind turbine having an enclosure with a hatch, including a first prong arranged between an external surface of the hatch and an external surface of the enclosure.

BRIEF DESCRIPTION OF THE DRAWINGS

Various aspects of this technology will now be described with reference to the following figures ("FIGS.") which are not necessarily drawn to scale, but use the same reference numerals to designate corresponding parts throughout each of the several views.

DETAILED DESCRIPTION OF THE INVENTION

Figure 1:
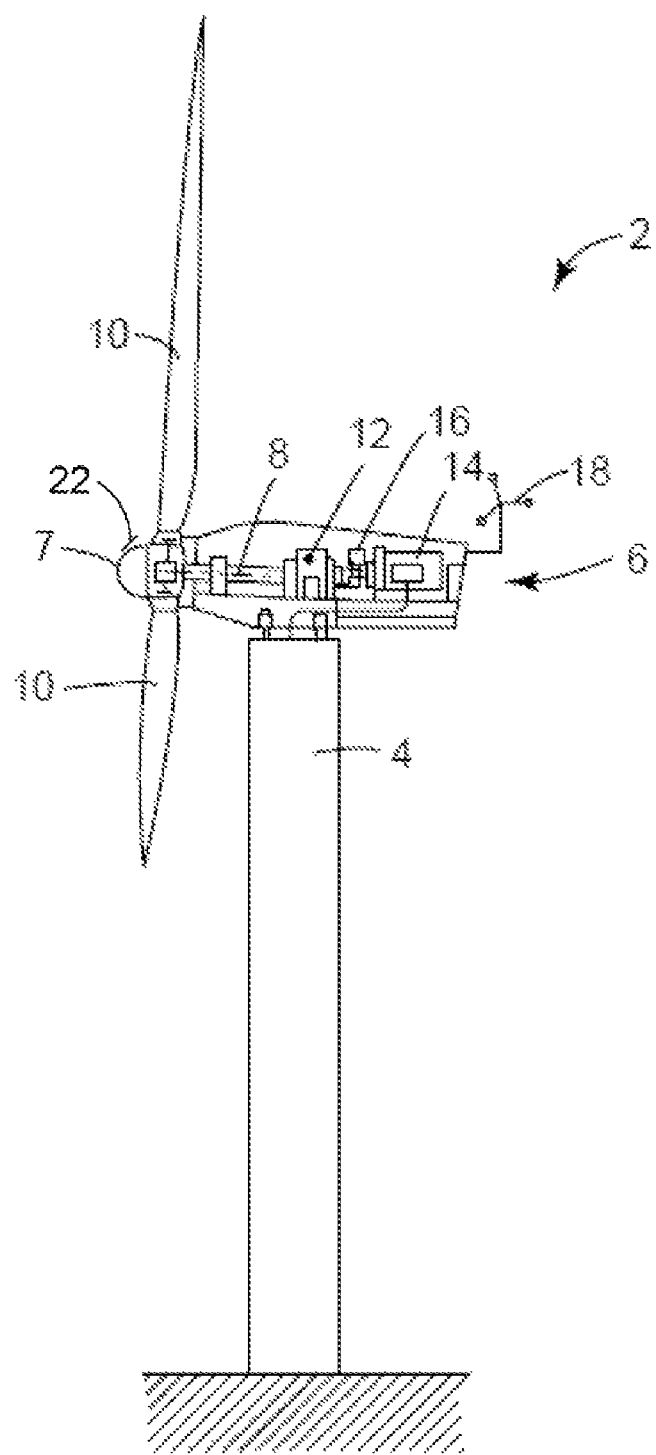
FIG. 1 is a schematic side view of a conventional wind generator.
Figure 2:
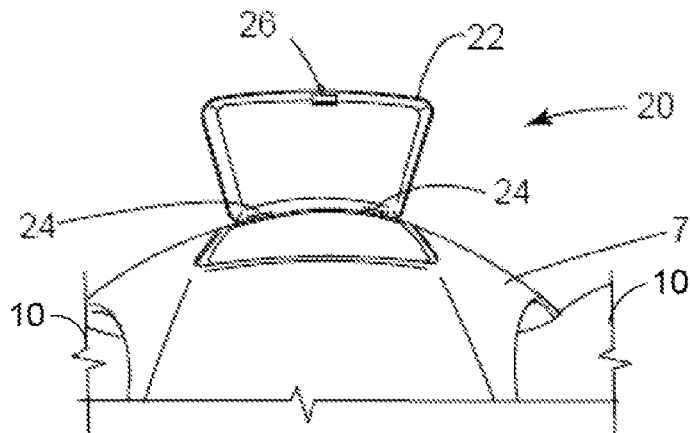
FIG. 2 is an orthographic view of a conventional hatchway for the wind generator shown in FIG. 1.
Figure 3:
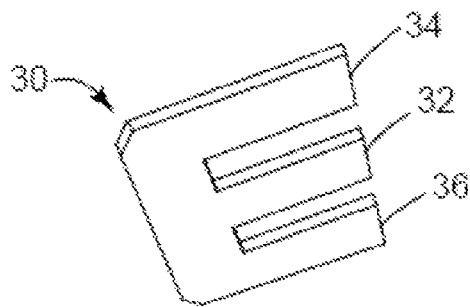
FIG. 3 is an orthographic view of a hatch stop for a wind turbine.

FIG. 3 is an orthographic view of a hatch stop 30. In the examples illustrated here, the hatch stop 30 is E-shaped with a first prong 32, a second prong 34, and a third prong 36 connected to each other. The E-shape also includes two U-shaped, C-shaped, or V-shaped portions formed by any two of the prongs 32 through 36 and the connection between them. One or more of the prongs 32 through 36 may be shorter than the others. For example, the hatch stop 30 may also be F-shaped with a shorter second prong 32 and/or no third prong 36.

Figure 4:
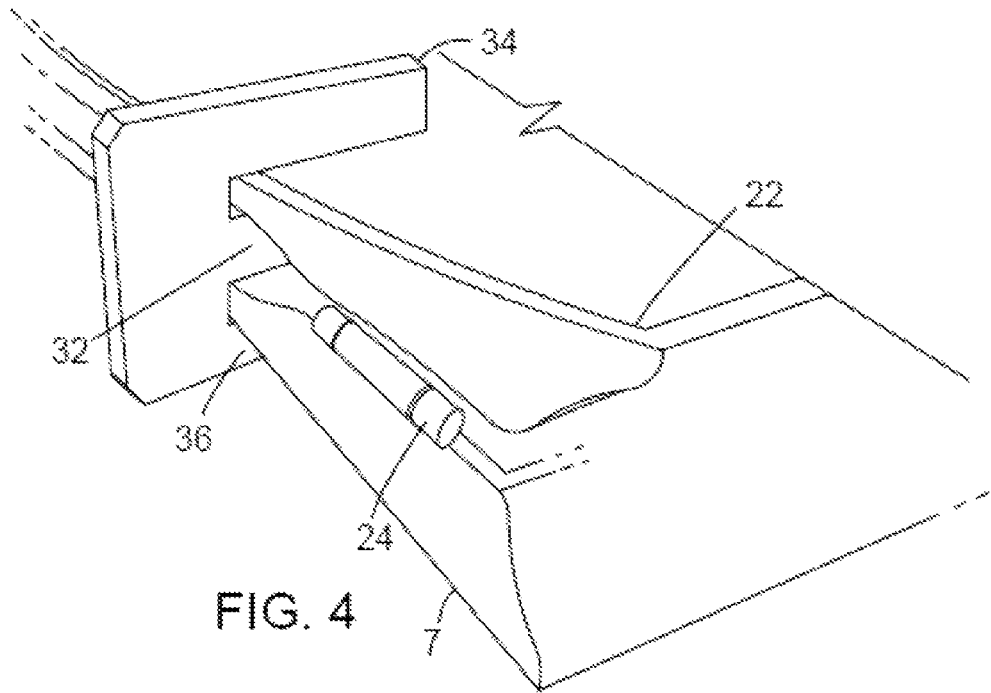
FIG. 4 is an orthographic view of the hatch stop of FIG. 3 in the hatchway of FIG. 2.

As illustrated in FIG. 4, a portion of the hatch stop 30 is arranged between an external surface of the hatch 22 and an external surface of the hub cone enclosure 7 when the hatchway 20 is fully open. In particular, the first prong 32 is wedged between the exterior surface of the hatch 22 and the exterior surface of the hub cone 7. The additional prongs 34 and 36 then provide a support structure for keeping the hatch stop 30 in place. However, the hatch stop 30 may also be secured in other ways, such as with removable fasteners and/or adhesives. Although the connections between the prongs 32 through 36 are illustrated here as being formed from the same rigid material as the prongs themselves, other rigid and/or flexible materials may also be used.

In the examples illustrated here, the first prong 32 extends between an external surface of the hatch 22 and an external surface of the hub cone enclosure 7. The second prong 34 is connected to the first prong 32 and is arranged against an internal surface of the hatch 22. A third prong 36 is also connected to the first prong 32 and second prong 34 is arranged against an internal surface of the hub cone enclosure 7. However, the various prongs 32 through 36 may be arranged in various other orders and configurations with or without the other prongs. For example, the first prong 32 may be arranged against an internal surface of the hub cone enclosure 7, and the second prong 24 may be arranged against an internal surface of the hatch 22. The hatch stop 30 may be similarly used with hatchways 20 in other areas of the wind turbine 2, such as the nacelle 6.

The hatch stop 30 described above provides various advantages over conventional screwed C-clamps. For example, the hatch stop 30 is easier and faster to install and remove. The hatch stop 30 is also less prone to operator error since it does not need to be screwed into engagement with the surfaces of the hatch 22 and/or hub cone enclosure 7.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A stop for an open hatch that is hingedly-connected to an enclosure, the stop comprising:

a spine extending across a gap between an external surface of the hatch and an external surface of the enclosure;

a first prong extending from the middle section of the spine into the gap between the enclosure and the hatch;

a second prong extending from one end of the spine in a direction of the first prong to rest against an internal surface of the hatch; and a third prong extending from the opposite end of the spine in the direction of the first prong to rest against an internal surface of the enclosure;

the second prong and third prongs providing support to the stop to maintain the hatch in the open position;

the first prong having a width in a direction parallel to the spine extending across the gap sufficient to substantially fill the gap between hinged edges of the enclosure and the hatch; and a width of the spine in a direction parallel to the first prong extending into the gap being substantially greater than a thickness of the spine in an orthogonal direction substantially parallel to the hinged edges of the enclosure and the hatch.

2. The hatch stop recited in claim 1, wherein a width of the first prong in a direction parallel to the spine extending across the gap is substantially greater than a thickness of the first prong in an orthogonal direction substantially parallel to the hinged edges of the enclosure and the hatch.

3. The hatch stop recited in claim 1, wherein a width of the second prong in a direction parallel to the spine is substantially greater than a thickness of the second prong in an orthogonal direction substantially parallel to the hinged edges of the enclosure and the hatch.

4. The hatch stop recited in claim 1, wherein a width of the third prong in a direction parallel to the spine is substantially greater than a thickness of the third prong in an orthogonal direction substantially parallel to the hinged edges of the enclosure and the hatch.

5. A stop for an open hatch that is hingedly-connected to an enclosure, the stop comprising:

a spine extending across a gap between hinged edges of the enclosure and the hatch;

a first prong extending from the middle of the spine into the gap between the enclosure and the hatch, wherein a width of the first prong in a direction parallel to the spine extending across the gap is sufficient to substantially fill the gap between hinged edges of the enclosure and the hatch, and wherein a width of the first prong in a direction parallel to the spine extending across the gap is substantially greater than a thickness of the first prong in an orthogonal direction substantially parallel to the hinged edges of the enclosure and the hatch;

a second prong extending from one end of the spine in a direction substantially parallel to the first prong to rest against an internal surface of the hatch; and a third prong extending from another end of the spine, opposite from the second prong, in a direction substantially parallel to the first prong to rest against an internal surface of the enclosure, the second and third prong providing support to the stop to maintain the hatch in the open position.

6. The hatch stop recited in claim 5, wherein a width of the second prong in a direction parallel to the spine is substantially greater than a thickness of the second prong in a direction substantially parallel to the hinged edges of the enclosure and the hatch.

7. The hatch stop recited in claim 5, wherein a width of the third prong in a direction parallel to the spine is substantially greater than a thickness of the third prong in a direction substantially parallel to the hinged edges of the enclosure and the hatch.

8. The hatch stop recited in claim 6, wherein a width of the third prong in a direction parallel to the spine is substantially greater than a thickness of the third prong in a direction substantially parallel to the hinged edges of the enclosure and the hatch.

* * * * *